United States Patent
Wolf et al.

(10) Patent No.: US 12,146,791 B2
(45) Date of Patent: Nov. 19, 2024

(54) SLIDING DOOR ASSEMBLY FOR AN ICP TORCH BOX

(71) Applicant: Thermo Fisher Scientific (Bremen) GmbH, Bremen (DE)

(72) Inventors: Tobias Wolf, Bremen (DE); Jan Rathkamp, Bremen (DE); Yannick Piero, Bremen (DE)

(73) Assignee: Thermo Fisher Scientific (Bremen) GmbH, Bremen (DE)

(*) Notice: Subject to any disclaimer, the term of this patent is extended or adjusted under 35 U.S.C. 154(b) by 345 days.

(21) Appl. No.: 17/597,850

(22) PCT Filed: Jul. 30, 2020

(86) PCT No.: PCT/EP2020/071465
§ 371 (c)(1),
(2) Date: Jan. 26, 2022

(87) PCT Pub. No.: WO2021/018993
PCT Pub. Date: Feb. 4, 2021

(65) Prior Publication Data
US 2022/0260498 A1  Aug. 18, 2022

(30) Foreign Application Priority Data
Jul. 31, 2019 (GB) ................................. 1910922

(51) Int. Cl.
*G01J 3/02* (2006.01)
*G01J 3/443* (2006.01)
(Continued)

(52) U.S. Cl.
CPC ............. *G01J 3/0291* (2013.01); *G01J 3/443* (2013.01); *G01N 21/73* (2013.01); *H05H 1/30* (2013.01)

(58) Field of Classification Search
CPC ............... G01N 24/088; G01N 33/487; G01N 2570/00; G01N 2800/52; G01N 24/08; G01R 33/4633; G01R 33/465
See application file for complete search history.

(56) References Cited

U.S. PATENT DOCUMENTS 5,520,358 A * 5/1996 Kahn ..................... B64D 47/08
    49/40
7,021,007 B2 * 4/2006 Jacobs ................ E05D 15/0691
    16/97
(Continued)

FOREIGN PATENT DOCUMENTS

| CN | 101014406 A | 8/2007 |
| CN | 211320048 U | 8/2020 |

(Continued)

OTHER PUBLICATIONS

GB1910922.2, Combined Search and Examination Report, Dec. 13, 2019, 3 pages.
(Continued)

*Primary Examiner* — David A Vanore (57) ABSTRACT

A sliding door assembly (50) for an inductively coupled plasma torch box (40) reduces the risk of heat related injuries and facilitates the handling of the torch box. The door assembly (50) comprises a door and a guiding mechanism (6) for allowing movement of the door in a first direction along an opening (45) of the torch box (40) so as to be able to open and close the torch box, and allowing movement of the door in a second direction, substantially perpendicular to the first direction, so as to move the door or at least a part thereof towards the opening when closing the torch box. The door may comprise an inner door panel interconnected with an outer door panel, so that only the inner door panel moves in the second direction, towards the opening (45) of the torch box (40) to tightly close it, while (Continued)

the outer door panel can maintain a safe temperature during operation.

23 Claims, 8 Drawing Sheets

(51) Int. Cl.
   *G01N 21/73* (2006.01)
   *H05H 1/30* (2006.01)

(56) References Cited

U.S. PATENT DOCUMENTS

| | | | | |
|---|---|---|---|---|
| 8,381,445 | B2* | 2/2013 | Hans | E06B 3/5072 |
| | | | | 49/316 |
| 11,834,204 | B1* | 12/2023 | Gorokhovsky | F03H 1/0043 |
| 2002/0062701 | A1* | 5/2002 | Guldi | G01N 15/0227 |
| | | | | 73/865.5 |
| 2006/0033061 | A1 | 2/2006 | Van Mast et al. | |
| 2010/0111266 | A1 | 5/2010 | Kuhnmuench | |
| 2012/0073205 | A1* | 3/2012 | Hamaker | E05D 15/48 |
| | | | | 49/163 |
| 2012/0159851 | A1* | 6/2012 | Seymour | E06B 3/5072 |
| | | | | 49/177 |
| 2014/0190085 | A1* | 7/2014 | Van Ingen | E04H 5/00 |
| | | | | 49/70 |
| 2015/0020453 | A1* | 1/2015 | Karl | E05F 17/00 |
| | | | | 49/130 |
| 2022/0187212 | A1* | 6/2022 | Quaas | H05H 1/30 |
| 2022/0260498 | A1* | 8/2022 | Wolf | G01J 3/443 |
| 2023/0207366 | A1* | 6/2023 | Park | H01L 21/67288 |
| | | | | 414/217 |
| 2023/0304340 | A1* | 9/2023 | Greenfield | E05F 17/004 |

FOREIGN PATENT DOCUMENTS

| | | |
|---|---|---|
| DE | 202004005991 U1 | 10/2004 |
| EP | 1467052 A1 | 10/2004 |
| EP | 2112504 A1 | 10/2009 |
| JP | H05138491 A | 6/1993 |
| JP | H10189292 A | 7/1998 |
| JP | H10280808 A | 10/1998 |
| JP | 2014004964 A | 1/2014 |
| JP | 2018204255 A | 12/2018 |
| KR | 20080103405 A | 11/2008 |
| WO | WO-2004090271 A1 | 10/2004 |

OTHER PUBLICATIONS

PCT/EP2020/071465, International Search Report and Written Opinion, Oct. 22, 2020, 11 pages.

* cited by examiner

SLIDING DOOR ASSEMBLY FOR AN ICP TORCH BOX

CROSS-REFERENCE TO RELATED APPLICATIONS

The present application is a 35 U.S.C. § 371 National Phase Entry of International Patent Application No. PCT/EP2020/071465, filed on Jul. 30, 2020, which claims priority benefit under one or more of 35 U.S.C. 119(a)-119(d) of GB Patent Application No. 1910922.2, filed Jul. 31, 2019, the contents both of which are incorporated herein by referencein their entireties.

FIELD

The invention relates to a sliding door assembly for a plasma source chamber or torch box for a spectrometer, such as for an ICP torch box in an ICP emission spectrometer.

INTRODUCTION

Plasma sources are commonly used in optical emission and mass spectrometers. In a plasma source, such as in inductively coupled plasma (ICP) sources, plasma is generated at a high heat, in which atoms and molecules can be ionized. In such a plasma, extremely high temperatures may occur, such as temperatures of 8,000 K or even 10,000 K.

In optical emission spectrometry, vaporized atoms and ions in a plasma are brought to high energy states. The atoms and/or ions subsequently relax to their ground state, during which process they give off electromagnetic radiation with wavelengths that are characteristic of the elements involved and depend on the quantized energy level structure of each atom or ion.

Detection of emitted photons can be performed by radial or side-on viewing of the plasma or by axial or end-on viewing of the plasma. Radial viewing is the classical operational mode of optical emission spectrometers. The optical path towards the detector typically involves an optical periscope that directs the incoming radiation towards the detector. The periscope has an internal mirror that deflects incoming electromagnetic radiation towards the detector. Due to the close proximity of the periscope to the plasma and the intense heat and radiation from the plasma, the optical mirror within the periscope may need to be replaced. Also, the plasma source needs regular maintenance. Thus, a user will need to be able to regularly access the inside of the plasma source chamber. Care must be taken whenever handling the ICP source or source chamber after the source has been in use due to the high temperatures involved. Thus, any mechanism for opening and closing the source chamber must be protective against heat, not only during use but also when opening the chamber for any type of maintenance or adjustment after use, and all parts that the user interacts with, such as a door handle and outer surfaces, should be thermally isolated from the heated interior. Further, the source chamber and door mechanism must protect also against UV light and electromagnetic radiation, outgoing as well as ingoing, so that the instrument as a whole complies with the electromagnetic compatibility requirements of laboratory standards.

An example of an ICP chamber is disclosed in U.S. Pat. No. 4,664,477. This prior art ICP chamber has a hinged door, which is less practical as the opened door, which may be hot, extends towards the operator of the instrument.

SUMMARY

The present invention seeks to provide a solution to the above challenges by providing a sliding door assembly for use with an ICP torch box/source chamber. The sliding door assembly reduces the risk of heat related injuries as it eliminates the possibility of inadvertently touching the inner surface of the door. It further provides a smooth and secure opening and closing of the torch box and improves the accessibility of the chamber as the door moves out of the way when fully opened and does not limit the space in front of the opening for operations and access.

In one aspect, the invention relates to a sliding door assembly for use with an inductively coupled plasma (ICP) torch box, the door assembly comprising a door, a guiding mechanism for allowing movement of the door in a first direction along at least one access opening of the ICP torch box so as to allow opening and closing the torch box, and allowing movement of the door or at least a part thereof in a second direction, substantially perpendicular to the first direction, so as to move the door or at least a part thereof towards the at least one access opening when closing the torch box.

By using a sliding door for closing off the access opening of the torch box, space is saved in front of the torch box and the risk of touching hot door parts is significantly reduced. By using a sliding door which is capable of moving both parallel to the opening and towards (and away from) the opening, preferably in a single movement, a good sealing of the opening can be achieved in a simple manner. The sliding door assembly of the present invention is preferably arranged for an essentially linear movement in two directions. In addition, the sliding door assembly of the present invention preferably lacks hinges and may be arranged for avoiding rotational movements of the door parts.

Accordingly, the guiding mechanism is preferably arranged for providing a substantially linear movement in both the first direction and the second direction.

Typically, a torch box has a single opening, which may be referred to as access opening as it provides access to the torch. However, embodiments can be envisaged in which the torch box has two or more openings which may be closed off by a single sliding door or by multiple sliding doors.

The second direction may be completely perpendicular to the first direction, thus defining an angle of 90°, but smaller or larger angles may also be used, such as angles of, for example, 45°, 60° or 80°.

The sliding door assembly can comprise a sealing mechanism for sealing the door to the torch box, in a properly and fully closed position. Preferably, the sliding door assembly comprises at least one resilient element for causing pressure to be applied to the door or door part in the second direction when the door is closed. The sealing mechanism can advantageously be resilient, such as comprising a silicon strip protruding from a groove circumscribing the at least one access opening of the torch box or a door frame surrounding the at least one opening that is being closed with the door mechanism, and/or protruding from a groove on the inside of the door.

The sliding door assembly preferably comprises a locking mechanism for locking the door in a closed position. 'Locking' as used herein indicates that the door slides into a particular final closed position and a force is required to bring it out of the locked position, thus it "locks" into the designated final closed position, preferably with a click and/or noticeable haptic feedback that indicates to the user that the position has been reached.

In some embodiments, the door of the door assembly comprises an inner door panel and an outer door panel, which are preferably interconnected so that the inner door panel is moved by the outer door panel. The configuration of an inner and an outer door panel provides enhanced thermal insulation, ensuring that the outside of the door does not get too hot. The guiding mechanism is preferably arranged so that it allows movement of the outer door panel in the first direction only (back and forth) parallel to the plane of the opening of the torch box, while allowing and guiding movement of the inner door panel in both the first direction and the second direction (and the respective opposite directions). Accordingly, this can be configured such that the outer door panel is engaged with a first sliding mechanism, for allowing longitudinal movement in the first direction of the outer door panel back and forth (opening and closing directions), with the inner door panel following the outer door panel, and wherein the inner and outer door panels are interconnected via a second sliding mechanism for allowing movement of the inner door panel relative to the outer door panel in both the first and the second direction. With this mechanism, the distance between the inner and outer door panels can be increased as the door is put in a fully closed and locked position so that the door is pressed against the chamber, giving an effective seal. Preferably, moving the outer door panel in the first direction will cause the inner door panel to simultaneously in the second direction. In some embodiments, the inner door panel moves over part of its trajectory simultaneously in the first direction and in the second direction.

In one embodiment, the inner door panel is configured so that the door assembly has a first closed position that is achieved by longitudinal movement in the first direction of the door along the first sliding mechanism towards an inner door stopper, and a second closed position that is achieved, after reaching the first closed position, by simultaneous longitudinal and transverse movement (i.e. in the first and second direction respectively) within the door assembly of the inner door panel relative to the outer door panel, along the second sliding mechanism. This can be suitably arranged such that when the inner door panel reaches the inner door stopper it cannot move further in the first direction (longitudinal direction) but the outer door panel can be moved further and by doing so, the second sliding mechanism guides the inner door panel in the second direction. Thus, the inner door panel moves not only in the perpendicular (or second) direction relative to the plane of the opening of the torch box, but in both directions relative to the outer door panel, as the outer door panel moves further in the first, longitudinal, direction.

Accordingly, in one embodiment of the door assembly of the invention, the outer and inner door panels are interconnected such that after the door has reached a first closed position, the space (distance) between the outer and inner door panels increases as the outer door panel is moved further in the first direction/closing direction and simultaneously the inner door panel moves inwardly towards the torch box opening. In other embodiments both the outer door panel and inner door panel move inwardly after the door has reached a first closing position, leading to the same functional result that the inner door panel moves closer to the torch box opening. Thus, if a sealing is placed between the inner door panel and torch box, the sealing is compressed as the inner door panel moves closer to the opening.

A second closed position is defined as a final position when the inner door panel is in a desired final position having moved inwardly towards the torch box opening to create a seal. Typically, the door cannot move further when the second closed position has been reached.

The inner door stopper can suitably be situated on the ICP torch box on which the door assembly is to be mounted, or on a door frame of the assembly or associated with the assembly that is to be mounted on the torch box. Such a door frame can be considered as a part of the door assembly but can also be seen as a separate optional part associated with the torch box but configured to operate with the door assembly.

As understood from the above, the second sliding mechanism can suitably be actuated by application of force in the first direction to the outer door panel following the inner door panel meeting the inner door stoppers. This can, for example, be arranged by providing the second sliding mechanism by at least a pair of parallel inner guide members that are arranged longitudinally (along the first direction) between the inner and outer door panels, and at least two pairs of bearings that interconnect with the inner guide members. The inner guide members can be fastened to the outer door panel and the pairs of bearings mounted on support fastened to the inner door panel, or vice versa, meaning that the inner guide members can in an alternative embodiment be fastened on the inner door panel and the supports holding the bearings in that case mounted on the outer door panel. Thus, when a force in the first direction is applied to the outer door panel, after it has reached the first closed position where the inner door panel stops at the stopper, further moving the outer door panel will force the bearings to move along the inner guide members (as the inner guide members, or the bearings, are moving along with the outer door panel in the first direction but the inner door panel cannot move further in that direction), thereby exerting a transverse force on the inner door panel and thereby moving the inner door panel in an inward direction, towards the opening of the torch box, and eventually into the second closed position.

The inner guide members can preferably be provided with slots and the supports holding the bearings being situated so that the bearings are placed in and mate with the slots and can move within the slots when the door panels move relative to each other, the slots each having an opening end and a closing end and being shaped such that when the door is moved towards the second closed position, the bearings move along the slots in a longitudinal and inward direction, towards the closing end of the slots, until they reach the closing end and the door is in the final closed position. The closing end of the slot is further away from the outer door panel than the opening end of the slot, such that when the bearing is in the closing end the door panels are further apart than when the bearings are in the opening ends of the slots. In the embodiment where the inner guide members are fastened on the inner door panel and the supports holding the bearings are arranged on the outer door panel the same applies, but in that embodiment the bearings have a fixed distance to the outer door panel and thus the slots are shaped so that the closing ends of the slots are further away from the outer door panel than the opening ends, such that the distance between the inner and outer door panels is greater when the bearing is in the closing end than in the opening end of the slot.

The slots can suitably have a gradient geometry so that the inward movement of the inner door panel decreases in magnitude relative to the simultaneous (relative) movement in the first direction, as the door is moved towards a second closed position. In other words, this means that as the outer door panel is moved towards the second or final closed position, the inner door panel moves inwardly, with gradually less movement per unit-length of movement of the outer door panel, as the outer door panel approaches the final closed position. Typically, the force required to move the door from the first to the second position gradually decreases as a result.

The sealing mechanism mentioned above can advantageously be provided on the inner door panel, for securely sealing the inner door to the ICP torch box or door frame thereof. The sealing mechanism can be provided by a heat resistant elastic sealing that extends around or near the outer periphery of the inner door panel, so that when in a closed position, the elastic sealing meets an outer surface of an IPC torch box (the surface having the opening to be closed by the door assembly) or a door frame that is tightly secured to the torch box, to generate a seal therebetween.

Preferably, during the movement of the inner door panel by the guidance of the second sliding mechanism, the elastic sealing is compressed by the inward movement of the inner door panel. It follows that the outer door panel is connected with the guiding mechanism such that it cannot move transversely, and thus as the second guiding means act to push the outer door panel and inner door panel apart as the outer door panel is moved towards the final closed position, the inner door panel is pressed inwardly as the outer door panel remains essentially fixed in its plane, not able to move transversely.

Preferably, a locking mechanism as mentioned above is arranged in the door assembly for locking the door assembly in the second closed position which is described above. The locking mechanism can be arranged with a groove in the inner guide members' slots, near the closing ends of the slots, so that when the door is moved towards its second closed position, the respective bearing that mates with the slot is pushed into the groove, thereby locking the door in the second closed position.

The locking mechanism can also be of other type, such as any of various suitable latch embodiments or a spring-function male-female locking mechanism that becomes engaged as the door is pushed into a locking position. It is preferred that the locking mechanism provides a haptic sensation when it locks and preferably "clicks" into position, such that it cannot be inadvertently almost but not fully closed.

In some embodiments the door assembly is further provided with an electronic closing sensor that senses if the door is fully and properly closed or not and connected to the instrument system such that the torch box cannot be operated unless the sensor gives a positive signal that the door is closed.

It follows that the slots are preferably shaped so as to have a generally tilted main direction relative to the opening/closing moving direction (first direction) of the door, this forces the bearings (and inner door panel) downwardly as the door is moved from the first closed position to the second closed position and upwardly when the door is opened from the second closed position to the first closed position.

Preferably, the mentioned grooves of the slots, providing the locking function, hold the bearings in a position slightly closer to the outer door panel than in an intermediate position where the bearing has to pass an edge point defining a boundary point between the groove and the main area of the slot. Thus, the edge point is the point of highest sealing pressure and is preferably shaped so as to form a haptic barrier, i.e. providing a haptic sensation as the bearing falls in the groove and the door thus falls in the locked-in position.

In useful embodiments the slots and grooves thereon are shaped and interact with the bearings such that the bearing will pivot away from the edge point when being pushed not sufficiently to pass over the edge point, meaning that if the door is not fully closed and does not attain the locked position (the bearings not pushed over the edge points) the bearings will pivot back and thus the door slide back. In some embodiments one or more springs are arranged to provide a force pulling back from an almost closed position to a more open position spring. Similarly, if the door is slightly pushed from a closed locked position but not sufficiently to push the bearings out of the grooves and over the edge point, they will pivot back, and the door will regain a fully closed and locked position.

In some embodiments one or more spring is provided and arranged between the inner and outer door panel to provide force pulling the door into a final closed position or provide force pulling the door open from a not fully closed position. Thus, in some embodiment one or more spring provides additional force in a direction pulling the door open if it has not reached a locking position, e.g. if a slot is provided as described above, such one or more spring can provide force to pull back the door if it has not been pushed beyond the edge point into a locked position.

The invention further provides an ICP torch box having a sliding door assembly as described herein.

Another aspect of the invention provides an inductively coupled plasma optical emission spectrometer comprising an ICP torch box provided with at least one sliding door assembly as described herein.

Yet another aspect of the invention provides the use of an ICP torch box provided with at least one sliding door assembly as described herein. Such use may comprise opening and/or closing the torch box by a movement substantially parallel to the front surface of the torch box.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

The sliding door in accordance with the invention can be arranged on an ICP torch box, such as an ICP torch box for an ICP emission spectrometer. The sliding door allows for easy and safe access to the interior of the torch box and can have a two-step mechanism for closing the door, so as to provide a secure closing and sealing mechanism of the torch box interior from its surroundings.

Thus, the sliding door can be adapted to move along an opening of an ICP torch box, which opening may be provided in a wall of the torch box. When the door is moved from an open to a closed position, the door moves in two directions; a first direction along the opening of the ICP torch box, and a second direction that is approximately perpendicular to the first direction, towards the opening and thus towards the ICP torch box. As the door moves in the second direction, the door is sealed in a locked position, thereby isolating the interior of the box. The movement in the second direction preferably follows the movement in the first direction, i.e. there is first a movement in the first direction to close the ICP torch box, followed by movement in the second direction to lock the door in a closed position and simultaneously provide a seal between the door and the torch box.

The sliding door can be provided as an assembly that constitutes two door panels, an inner door panel and an outer door panel. During the first movement of the door assembly, the inner and outer door panels move in a concerted fashion; the movement in the second direction is preferably effected by the inner door panel only. Thereby, the inner door panel provides the seal between the door assembly and the torch box.

Figure 1:
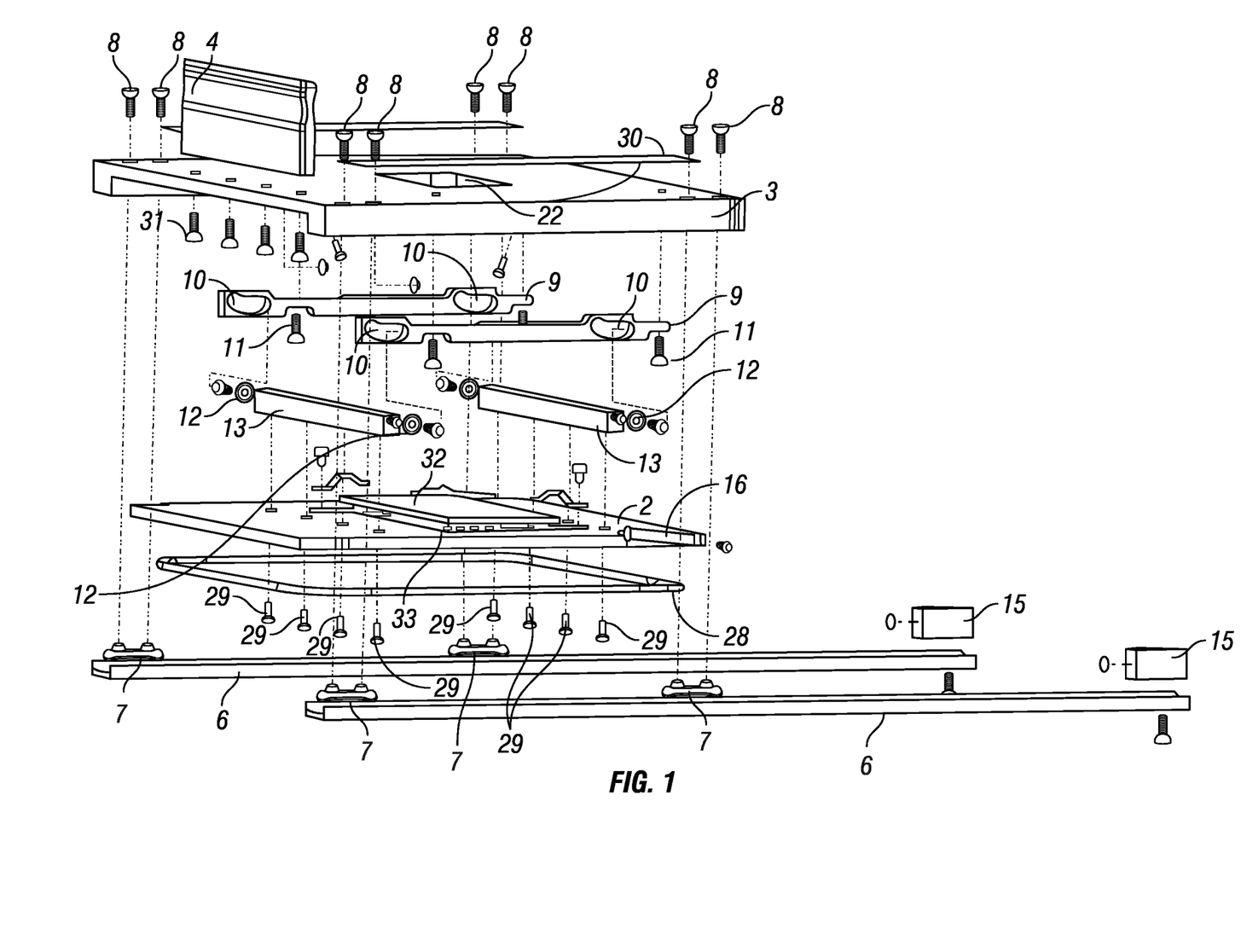
FIG. 1 shows an exploded view of the door assembly according to the invention.

An exploded view of the main parts of a door assembly in accordance with an embodiment is shown in FIG. 1, together with guiding means of such a door assembly. FIG. 1 shows how guide blocks 7 are fastened with screws 8 to the outer door panel 3. Adhesive fasteners 30 are fastened to the outer door panel to hold an optional outer front shield 5 (not shown). The outer A window frame 22 is arranged on the outer door panel 3 to expose a window on the inner door panel 2 that comprises a window 32 (preferably made of thermal welding glass to block UV light) and a grid 33 formed by a drilled hole pattern in the inner door panel 2 (which makes it possible to observe plasma without creating an opening for electromagnetic radiation). The glass 32 may be held by, for example, two or four clamps. Handle 4 is fastened to the outer door panel with screws 31. Second guiding members 9 are fastened to the outer door panel with screws 11. The second guiding members have slots 10 that interact with bearings 12 which are held by support members 13. The support members 13 are fastened to the inner door panel 2 with screws 29. A sealing 28 is adhered to the inside of the inner door panel. The guide blocks 7 can slide along rails 6. Outer door stoppers 15 stop the sliding motion of the door when the door is moved towards a fully open position.

Figure 2:
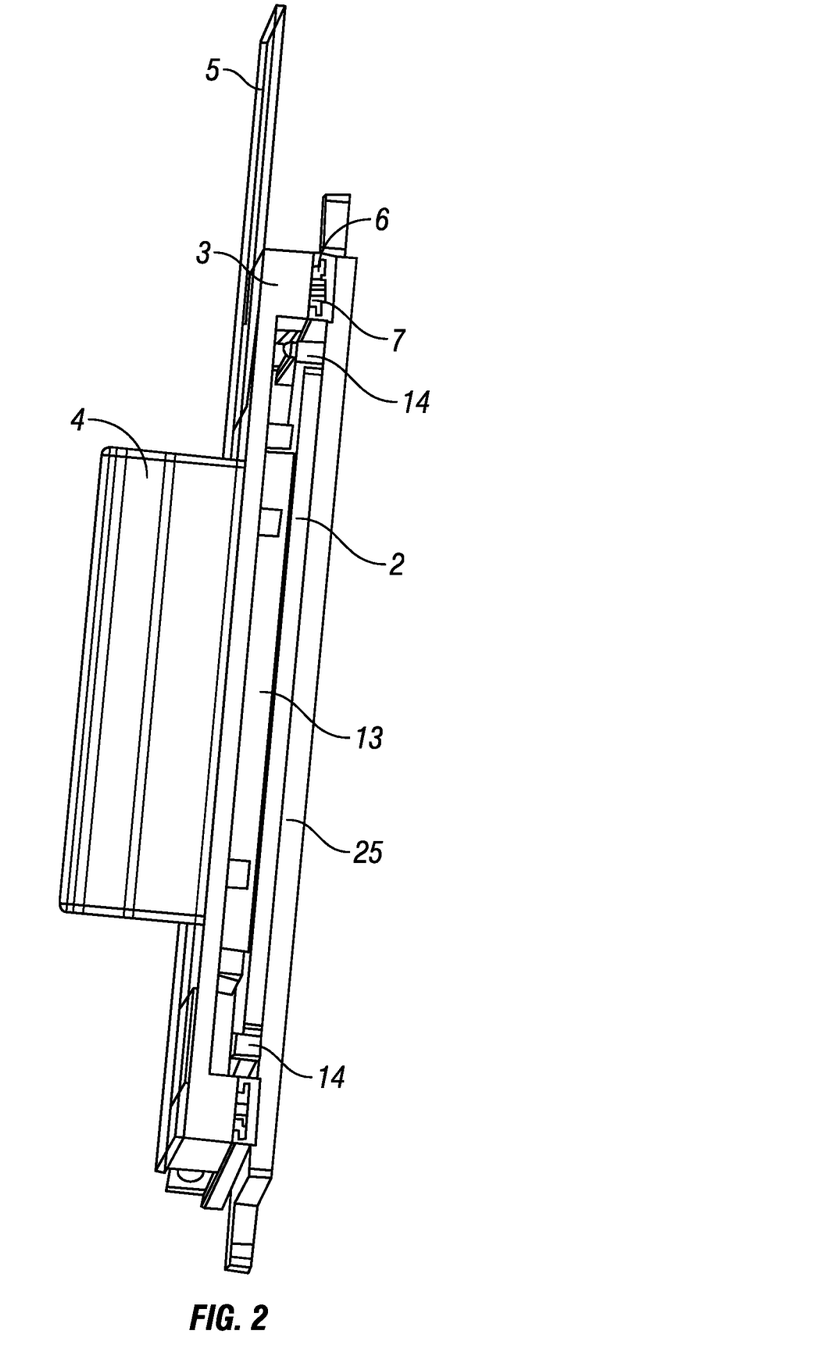
FIG. 2 shows a side view of the door assembly according to the invention.

FIG. 2 shows a side view of the door assembly showing the outer door panel 3 which is interconnected with the inner door panel 2. An optional front shield 5 is fixed to the outer door panel 3 and a handle 4 is also fixed to the outer door panel 3, for operating the door. The outer door panel 3 is connected to parallel guide rails 6. Support members 13 are fixed to the inner door panel 2; attached to the support members are bearings (not seen in this figure) that mate with slots in second guiding members 9 that form part of the second guiding means. The second guiding members 9 are fixed to the outer door panel 3. Inner door stoppers 14 stop the sliding motion of the inner door panel 2 when it has reached the desired closed position.

The door assembly is assembled so that the inner and outer door panels can move in a concerted fashion as the door slides along guide rails 6. Stoppers 14, 15 provide limits for the movement of the inner door panel 2 along the torch box side (i.e. parallel to the torch box opening), while inner guides 9, in particular slots 10 in the inner guides 9 and bearings 12 provide for the mechanism that forces the inner door panel 2 inwardly as the door is closed.

During use, the door assembly moves along guide rails 6 in a first direction, along an opening on a side wall of a torch box. As the door moves towards a closed position (from right to left in FIG. 1), the inner door panel 2 will reach the inner door stoppers 14. As a result, the inner door panel 2 can no longer move in the first direction, in front of the opening of the torch box, substantially perpendicular to the direction of access to the opening. Continued application of force to the door assembly, e.g. by application of force to handle 4 towards the closed position will apply force to the outer door panel 3 and attached slots 10 in guiding members 9. Simultaneously, the bearings 12 that are fixed to the inner door panel will be forced to move along the slots 10. As a consequence, the outer door panel 3 will continue to move along the torch box opening (in the first direction) and simultaneously, the inner door panel 2 will be forced in a second direction that is perpendicular to the first direction. When the outer door panel 3 has been moved so far that the bearings 12 have reached the end of the slots 10, continued movement of the outer and inner door panels is prevented, and the door has reached a closed and locked position.

Figure 3:
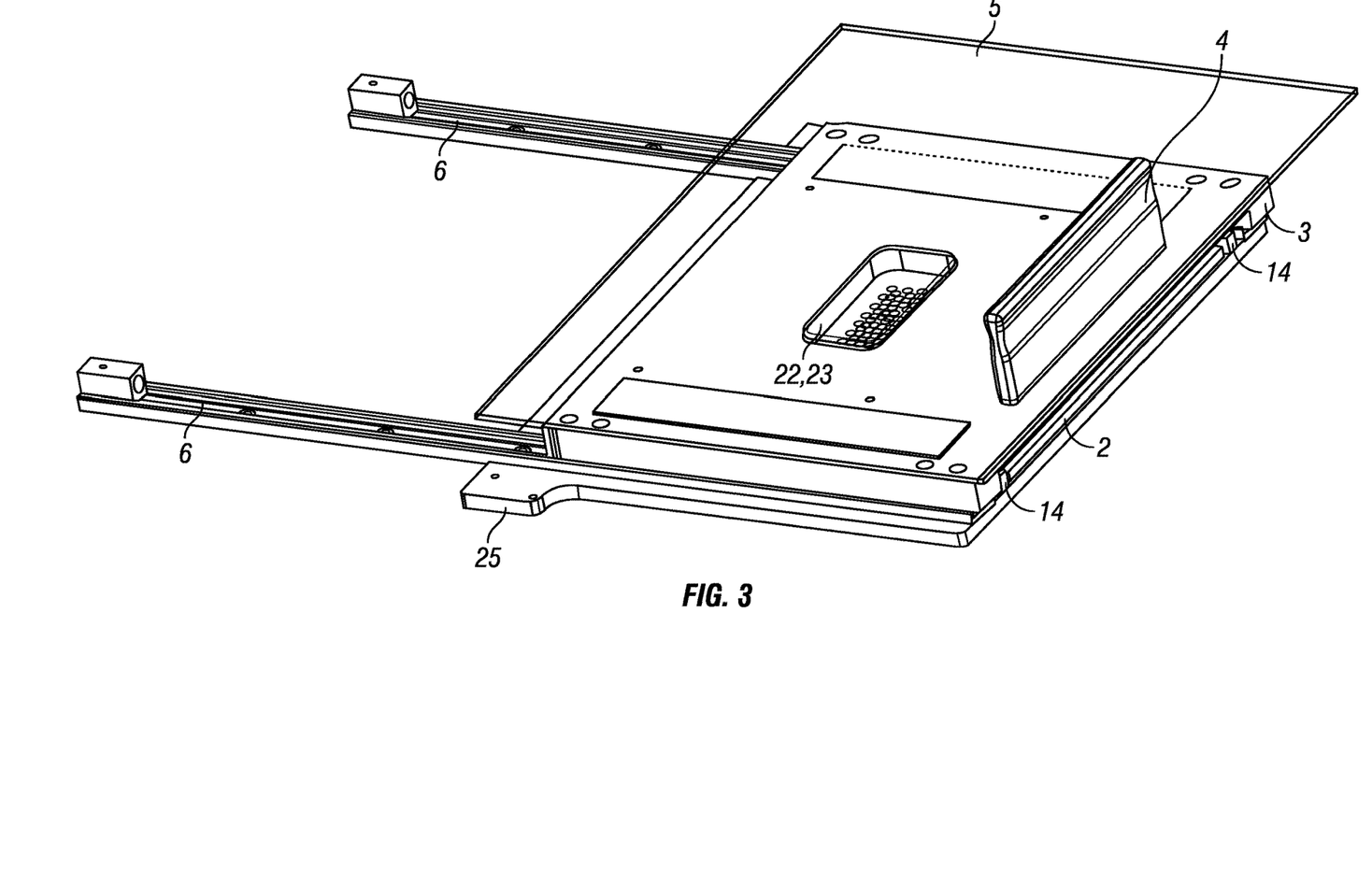
FIG. 3 shows a perspective view of the door assembly in a closed position.

FIG. 3 shows a perspective view of the door assembly with the front shield 5 fixed to the outer door panel 3 and handle 4. A window frame 22 is arranged in the outer door panel 3 (and the front shield 5) to expose a window 23 arranged in the inner door panel 2 through which the plasma can be observed.

Figure 4:
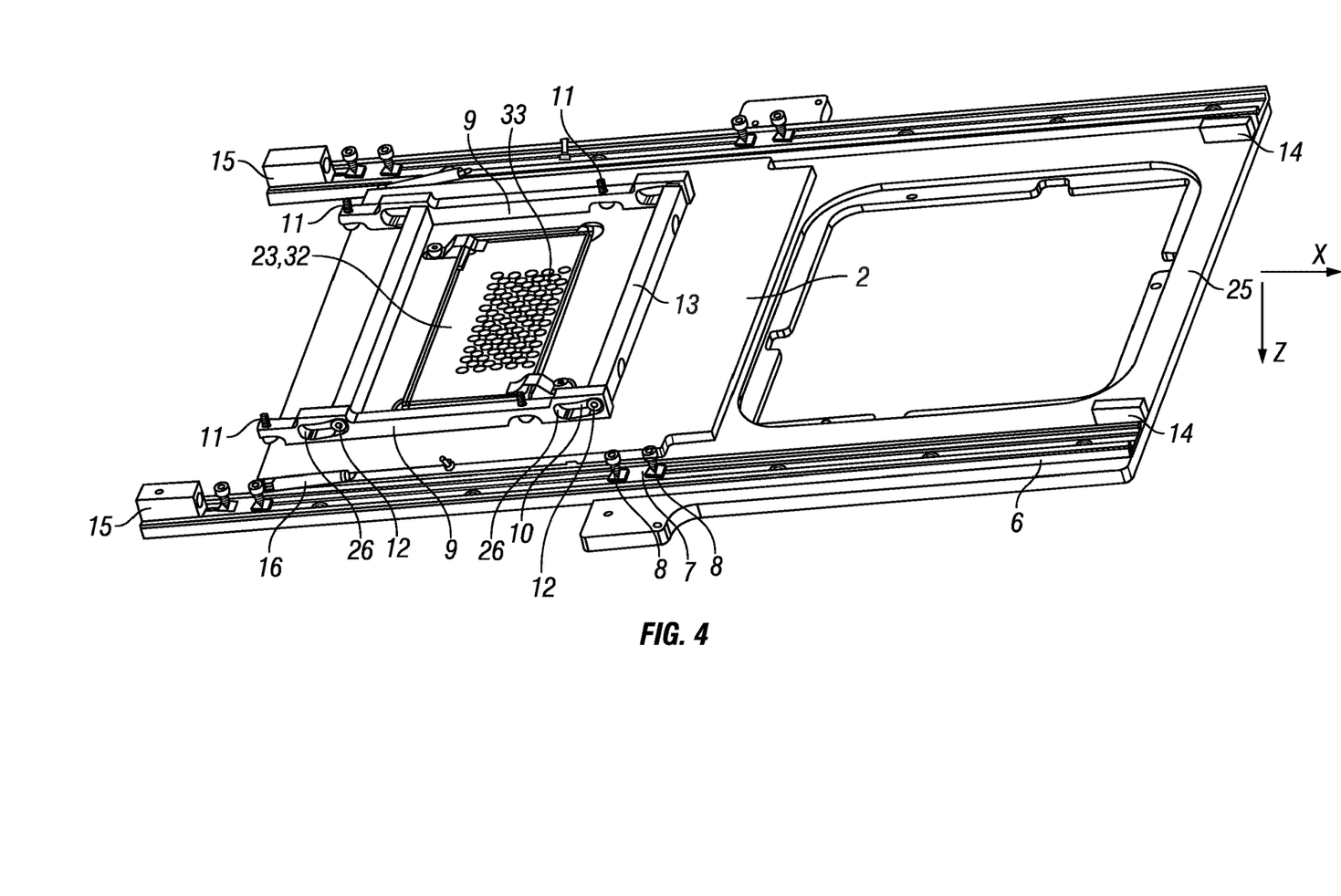
FIG. 4 shows a perspective view of the door assembly in an open position, where the outer door panel has been removed from the figure.

FIG. 4 shows details of the door assembly by removing from the figure the outer door panel 3. The door assembly is here in a fully open position. The first direction of movement (opening/closing direction) is shown with an arrow X and the second direction, transverse direction, with an arrow Z. A first sliding mechanism is shown, comprising guide rails 6 and guide blocks 7 that can slide along the rails 6. The guide blocks 7 are fastened to the outer door panel 3 (not shown in FIG. 4 for the sake of clarity) with screws 8. The rails and guide blocks mate together such that the guide blocks can only move back and forth along the rails but cannot move transversely to the sliding direction, up from the guide rails. The guide rails 6 are fastened either to a front surface of the ICP torch box (the surface with the opening of the torch box which the door assembly is to close and open) or onto a door frame 25 which is fastened to the front surface of the torch box. A pair of parallel second guiding members 9 are shown which are fixed with screws 11 to the outer door panel 3 (not shown in this figure). Support members 13 are fixed to the inner door panel 2. At the ends of the support members 13 bearings 12 are attached that mate with guiding slots 10 of the second guiding members 9. When the door is moved towards a closed position, by pushing the handle 4 in the first direction, the outer door panel 3 moves with the handle (as these are connected) and the inner door panel 2 moves along as the slots 10 pull the bearings 12 that are fixedly arranged to the inner door panel 2 via the support members 13. The inner door panel 2 will eventually meet inner door stoppers 14 (which may also be referred to as inner stoppers) and cannot move further. If the handle is pushed further, the outer door panel 3 will move further along with its fixed second guiding members 9, thus the slots 10 move also in the longitudinal direction and due to the shape of the slots 10, the bearings 12 are forced inwardly (towards the torch box opening) until they reach the ends of the slots 10. The inner door panel 2 moves with the bearings 12 and is thus pressed inwardly towards the door frame 25 of the torch box.

At the closing ends of the slots 10, the bearings 12 may lock into a groove (26 in FIG. 8) of the slot 10, if such grooves or other means are provided to define an end position of the bearings 12. In general, end position defining surfaces may be provided, which may be constituted by a groove and/or at least one ridge, and which may assist the bearings 12 in reaching a stable predetermined end position.

Springs 16 are arranged in between the inner and outer door panels. These springs 16 exert a force pulling back the door from an almost closed position (if the bearings 12 have not reached the grooves or edges in the slots to come into a defined closed position). The springs 16 thus aid in providing a movement of the bearings 12 such that the door will not be left in an almost but not fully closed position.

Figure 5:
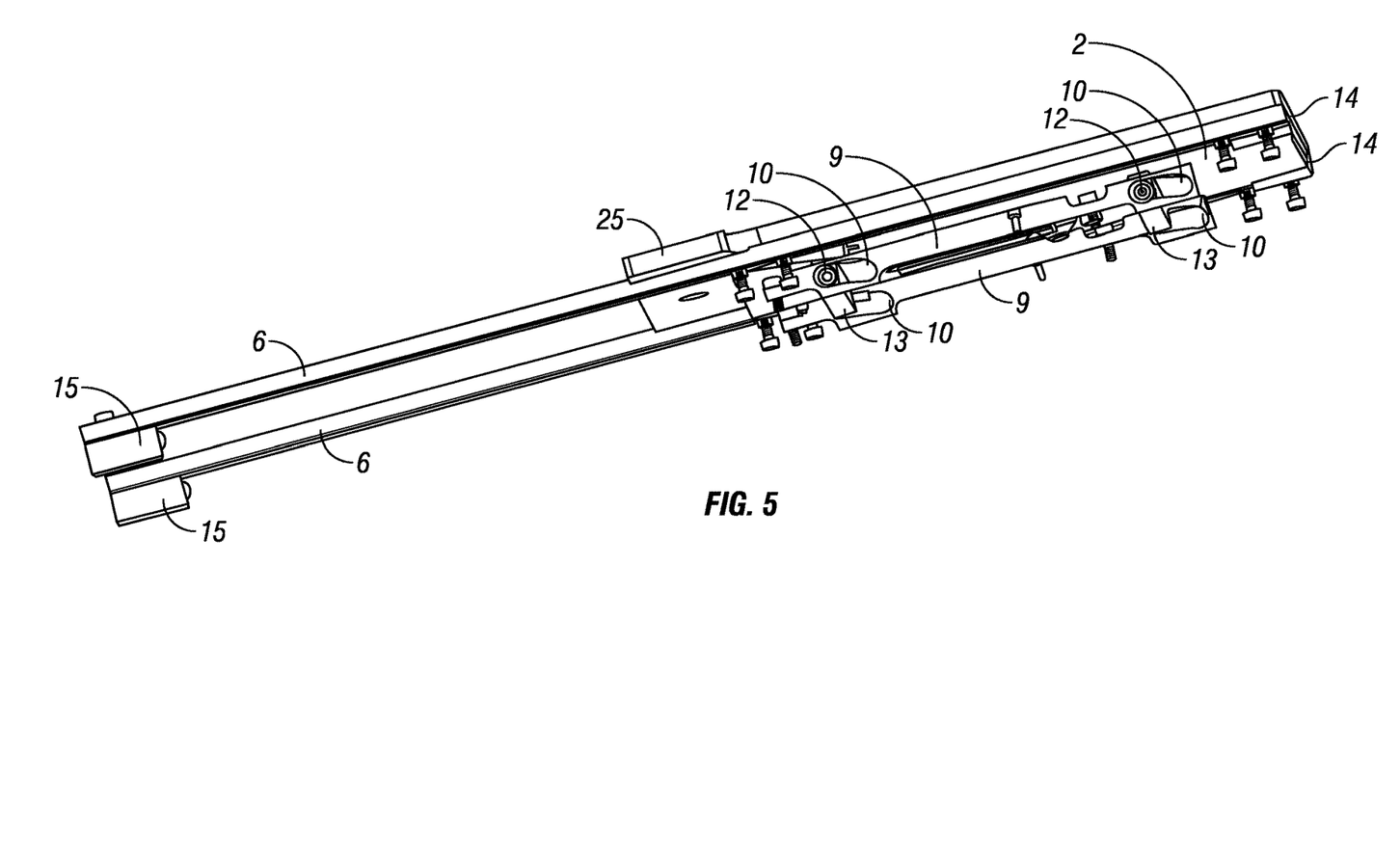
FIG. 5 shows the door assembly (without outer door panel) in a second closed position.

The closed and "locked" position is shown in FIG. 5 (also in this figure the outer door panel 3 is not shown, for purpose of clarity). The handle 4 has been moved all the way until first the inner door panel 2 hits the inner stoppers 14 and then further, pulling the outer door panel with the fixed second guiding members 9 such that the slots 10 move in the closing direction and the bearings 12 remain put in this direction (as the inner door panel cannot move further) but the bearings 12 are forced inwardly as the slots 10 move, until the bearings 12 meet the closing ends of the slots. At the closing ends the slots 10 may have a slight groove and/or recess which is arranged such that the bearings 12 can move slightly outwards to rest against the end position defining surfaces.

As the bearings 12 approach the edge point (point P in FIG. 6) of the slots 10 during the closing motion, the point after which the bearings rest against the end position defining surfaces, which may comprise a groove or recess, the sealing 28 on the inner door frame is being compressed against the door frame 25. As the bearings fall into the grooves the pressure is slightly released as the bearings move slightly outwardly (away from the torch box). In order to move the door in the opposite direction to open it again, the bearings have to move back over the point of higher pressure (the edge point P in FIG. 6), and this creates a locking position of the door, as the bearings 12 rests in the grooves or recess of the slots 10. The edge points (P in FIG. 6) of the grooves or recesses 26 are shaped suitably sharp to provide a haptic click-sensation as the door reaches the locked position.

The slots 10 are shaped to have a general tilted main direction relative to the opening/closing moving direction of the door. This forces the bearings 12 (and inner door panel 2) inwardly as the door is moved to the second closed position and outwardly when the door is opened from the second closed position to the first closed position. The angle of the slots 10 can have a gradient, meaning that in the closing motion, the angle gradually decreases, to compensate for the increased pressure needed as the door is moved further and the sealing is being pressed. Thus, per unit of distance in the X-direction (main opening/closing direction of the door, see FIG. 4) the movement in the Z-direction (transverse direction) is reduced, to reduce the force needed for the closing motion.

Figure 6:
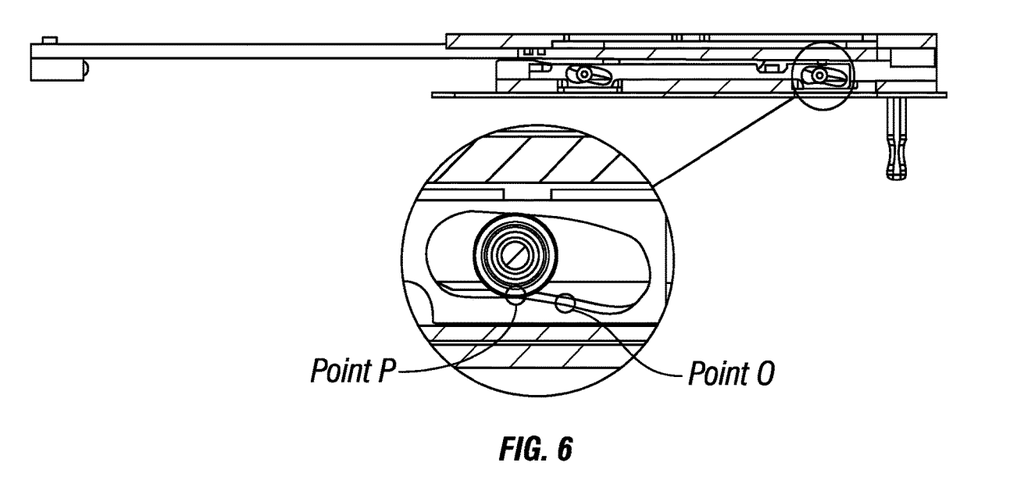
FIG. 6 shows a close-up view of a slot in a guiding member of a second sliding mechanism of the guiding means.

FIG. 6 shows a close-up view of one of the slots 10. In this embodiment the inclination of the slot varies substantially stepwise. On the right-hand side is the opening end of the slot 10, where the bearing 10 is located when the door is open. When the bearing 12 is positioned in the opening end, the spacing between the inner door panel 2 and the outer door panel 3 is at its minimum and there is no pressure applied by the sealing 28 against the door frame 25 or any other surface (the sealing 28 does not touch or barely touches the door frame 25 when the bearing 12 is in this position). As the bearing 12 moves from the opening end towards the opposite closing end, it passes point O, at which point the sealing 28 may touch the door frame 25. Beyond this point O the inclination of the slope of the slot 10 is smaller such that the transverse movement of the inner door panel 2 is less per unit of movement of the outer door panel 3. As the outer door panel 3 (and the slot 10 thereby) is pushed further, moving the bearing relative to the slot from point O towards point P, the sealing 28 is more compressed and the force required to move the door incrementally increases. Then, as the bearing 12 reaches point P, the sealing pressure is at its maximum, and as the bearing 12 moves beyond point P the sealing pressure is slightly reduced as beyond the point P the inclination of the slope of the slot 10 is reversed, thus slightly decreasing the spacing between the inner door panel 2 and the outer door panel 3.

Figure 7:
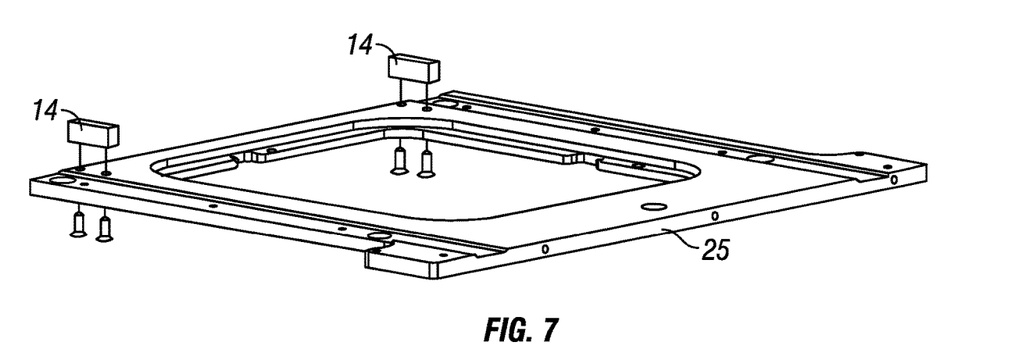
FIG. 7 shows a door frame of the door assembly according to the invention.

FIG. 7 shows a door frame 25 of the door assembly onto which the rails 6 (not shown) and internal stoppers 14 are to be mounted. The door frame 25 can be provided as a separate component to be attached to a torch box. Alternatively, the door frame can be internal to the torch box, so that the additional door assembly components can be attached directly to the torch box.

Figure 8:
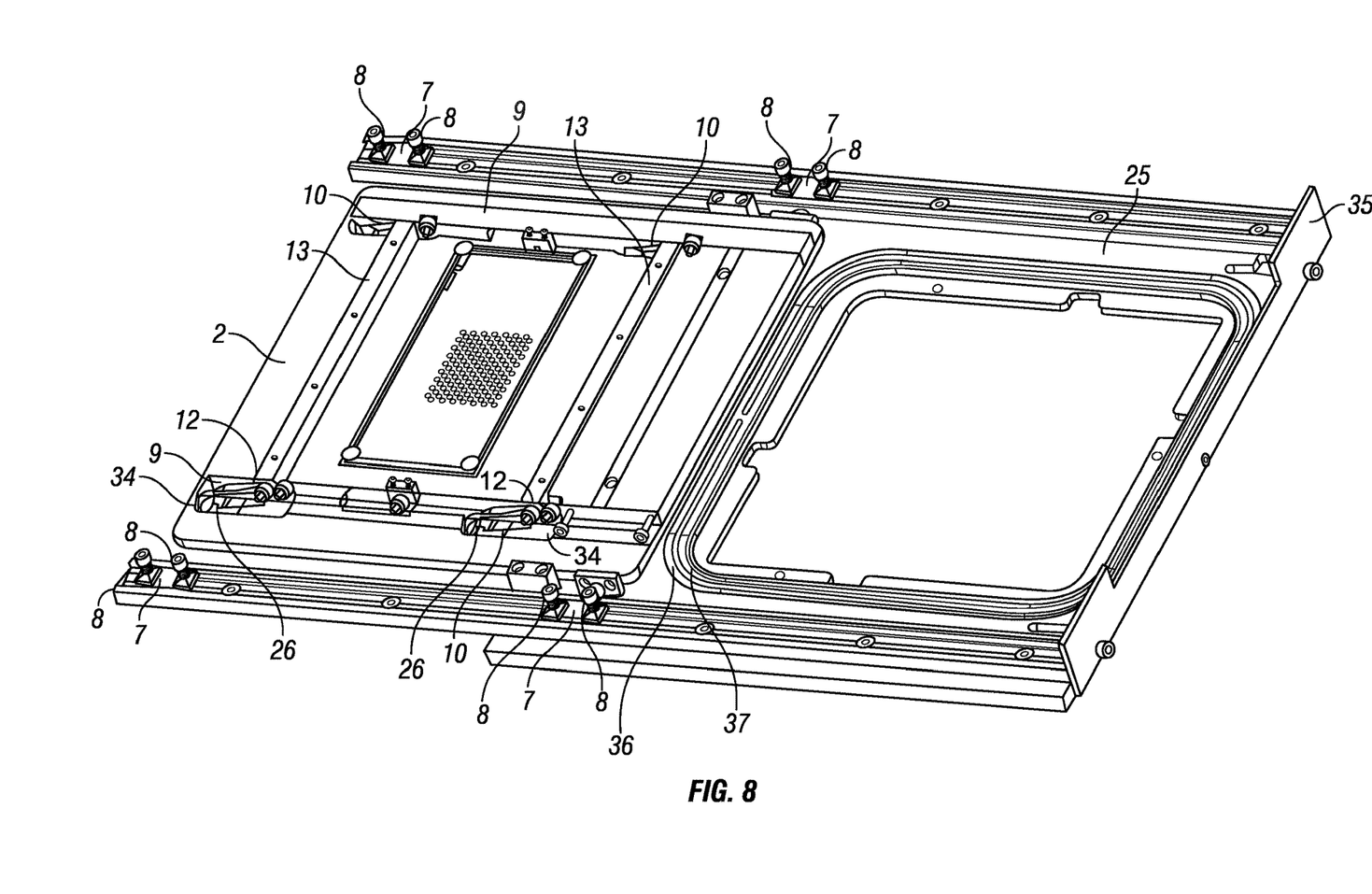
FIG. 8 shows an alternative embodiment of the door assembly according to the invention.

FIG. 8 shows an alternative embodiment of the door assembly (shown with the outer door panel removed), with differently shaped slots 10 and a stopping panel 35 serving the role as a stopper for door movement along the torch box opening. Two second guiding members 9 (one is shown transparent for clarification) are fastened on the outer door panel (not shown) and have guiding slots 10. Support members 13 are mounted on the inner door panel 2, these support members 13 are provided with bearings 12 that interact with the slots 10. The slots 10 have a groove 26 into which the bearings 12 lock in a second closed position of the door. In this embodiment the inner door panel 2 has depressions 34 for receiving parts of the second guiding members 9 when the door panels are closer together (in an open position). Two grooves 36, 37 circumscribe the opening of the door frame 25. These grooves 36, 37 are designed for receiving sealings (not shown) that create a seal between the door frame 25 and the door.

This embodiment therefore also provides a two-step closing mechanism of the torch box door assembly, by movement in a first direction, along the torch box opening, and by movement in a second direction, that forces the inner door panel towards the torch box, providing a seal between the closed door and the torch box.

Figure 9A:
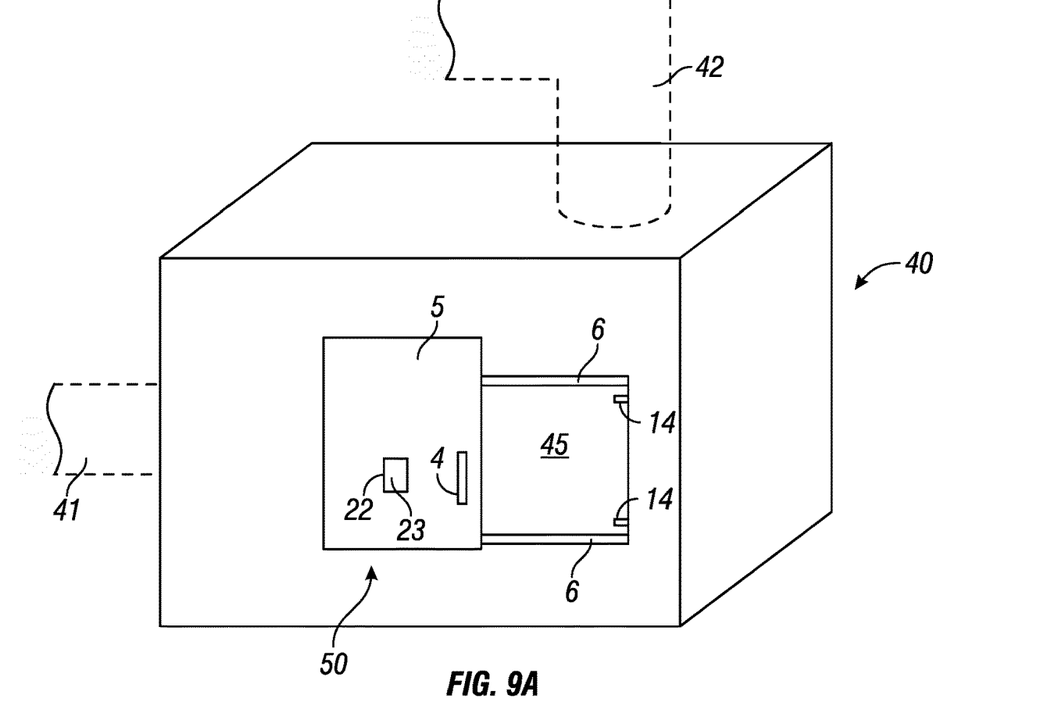
FIGS. 9A & 9B show a schematic view of an ICP torch box having a sliding door assembly in accordance with an embodiment of the present invention.
Figure 9B:
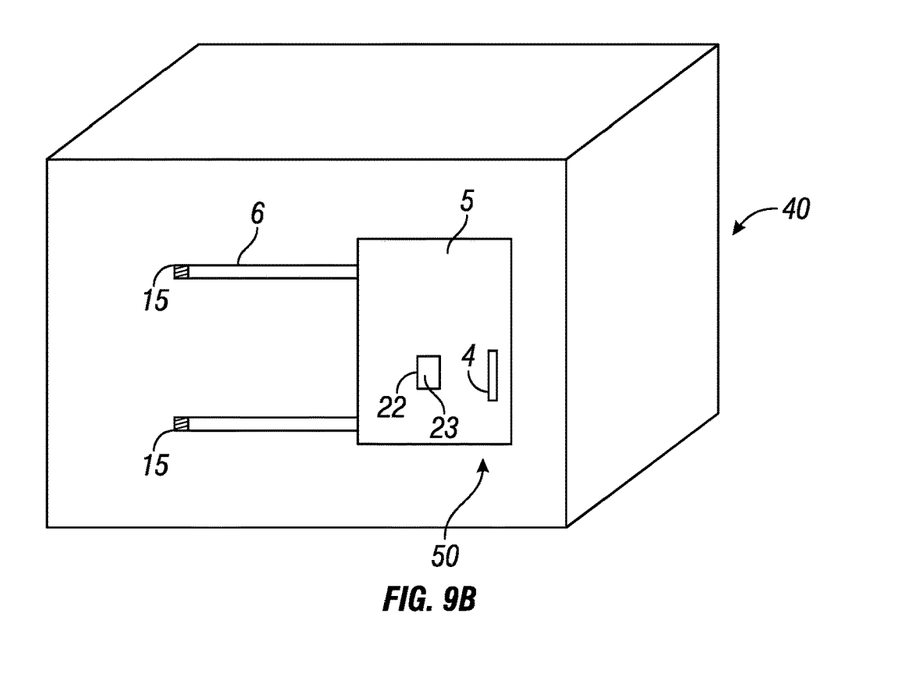

In FIGS. 9A & 9B, there is shown a schematic view of a torch box having a sliding door in accordance with the invention. An axial and a radial viewer 41, 42 of an ICP emission spectrometer are shown in dotted lines, indicating that the torch box can be configured as a single or dual view instrument. It will be understood that a torch can be mounted horizontally or vertically in the torch box.

In FIG. 9A there is shown a torch box 40 and a sliding door assembly 50, with the door being in an open position, showing the access opening 45 of the torch box 40. Only the front shield 5, handle 4, window frame 22 and window 23 of the door assembly 50 can be seen in this view, together with parts of guide rails 6 and inner door stopper 14.

In FIG. 9B, the door assembly 50 is shown in a closed position, exposing parts of guide rails 6 and outer door stoppers 15. During use, the plasma torch can be viewed through the window 23, allowing for inspection of the plasma torch without opening the torch box.

As is schematically shown in FIGS. 9A & 9B, the door assembly 50 allows complete or almost complete access to the opening 45 in the torch box, as is also shown in FIGS. 4 & 8. That is, the door assembly 50 allows close to 100% of the opening 45 to be accessed, preferably at least 75%, more preferably at least 90%. The entire opening 45 is preferably closed off using a single door, however, the use of two doors can also be envisaged. Conversely, a single door could be used to close off two (or more) openings. If the torch box 40 comprises two or more openings that require temporary closing, a separate sliding door for each opening is preferred.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A sliding door assembly for use with an inductively coupled plasma torch box, the door assembly comprising a door, a guiding mechanism for allowing a movement of the door in a first direction along an opening of a torch box so as to allow opening and closing the torch box, and in a second direction, substantially perpendicular to the first direction, so as to move the door or at least a part thereof towards the opening when closing the torch box.

2. The sliding door assembly according to claim 1, wherein the door assembly further comprises a sealing mechanism for sealing the door to the torch box.

3. The sliding door assembly according to claim 2, wherein the sealing mechanism comprises at least one resilient sealing element for providing sealing between the door and the torch box or a door frame thereof.

4. The sliding door assembly according to claim 1, wherein the guiding mechanism is arranged for providing a substantially linear movement in both the first direction and the second direction.

5. The sliding door assembly according to claim 1, further comprising a locking mechanism for locking the door in the closed position.

6. The sliding door assembly according to claim 1, wherein the door comprises an inner door panel and an outer door panel.

7. The sliding door assembly according to claim 6, wherein the inner door panel and the outer door panel are interconnected so that the inner door panel is moved by the outer door panel.

8. The sliding door assembly according to claim 6, wherein the guiding mechanism is arranged for allowing the inner door panel a movement in both the first and the second direction while allowing the outer door panel a movement in the first direction only.

9. The sliding door assembly according to claim 6, wherein the outer door panel is engaged with a first sliding mechanism, for allowing movement of the door in the first direction, and wherein the inner and outer door panels are interconnected via a second sliding mechanism for allowing movement of the inner door panel in both the first and the second direction.

10. The sliding door assembly according to claim 9, wherein the inner door panel is configured so that the door assembly has a first closed position that is achieved by movement in the first direction of the door along the first sliding mechanism towards an inner door stopper, and wherein the door assembly is further configured so as to have a second closed position that is achieved by simultaneous movement in the first and second direction of the inner door panel relative to the outer door panel within the door assembly, along the second sliding mechanism.

11. The sliding door assembly according to claim 10, wherein the inner door stopper is provided on the torch box or door frame thereof on which the door assembly is to be mounted.

12. The sliding door assembly according to claim 11, wherein the second sliding mechanism is actuated by application of force in the first direction to the outer door panel following the inner door panel meeting the inner door stopper.

13. The sliding door assembly according to claim 9, wherein the second sliding mechanism is provided by at least a pair of parallel inner guide members that are arranged substantially in the first direction between the inner and outer door panels, and at least two pairs of bearings that interconnect with the inner guide members.

14. The sliding door assembly according to claim 13, wherein the inner guide members are secured to the outer door panel and the bearings are secured on the inner door panel so that when force is applied in the first direction to the outer door panel after the door has reached the first closed position, the bearings are forced along the inner guide members, thereby exerting a transverse force on the inner door thereby moving the inner door in an inward direction.

15. The sliding door assembly according to claim 14, wherein the inner guide members are provided with slots with which the bearings mate and can move along, from an opening end to a closing end thereof, and wherein the slots are shaped so that when the door assembly is moved towards a closed position, the bearings move relative to the slots along the slots in the first and second direction.

16. The sliding door assembly according to claim 15, wherein the slots have a gradient geometry so that the relative inward movement of the inner door panel decreases in magnitude per unit movement in the first direction as the door is moved towards a closed position.

17. The sliding door assembly according to claim 1, wherein the door comprises an inner door panel and an outer door panel, and wherein the inner door panel is provided with a sealing mechanism, for securely sealing the inner door to the torch box or door frame thereof.

18. The sliding door assembly according to claim 17, wherein the sealing mechanism is provided by a heat resistant elastic sealing that extends around or near the outer periphery of the inner door panel, so that when in a closed position, the elastic sealing meets an outer surface of the torch box or door frame thereof to generate a seal therebetween.

19. The sliding door assembly according to claim 18, wherein during the movement of the inner door panel along the second sliding mechanism, the elastic sealing is compressed by inward movement of the inner door panel.

20. The sliding door assembly according to claim 10, further comprising a locking mechanism, for locking the door assembly in the second closed position.

21. The sliding door assembly according to claim 20, wherein the locking mechanism is provided by a groove in the inner guide slot, near a closing end of the slot, so that when the door is moved towards its second closed position, a bearing is pushed towards the closing end of the slot and into the groove, thereby locking the door in the second closed position.

22. An inductively coupled plasma torch box comprising a sliding door assembly as set forth in claim 1.

23. An inductively coupled plasma optical emission spectrometer comprising an inductively coupled plasma torch box as set forth in claim 22.

* * * * *